US007870102B2

(12) United States Patent
Haustein et al.

(10) Patent No.: US 7,870,102 B2
(45) Date of Patent: Jan. 11, 2011

(54) APPARATUS AND METHOD TO STORE AND MANAGE INFORMATION AND META DATA

(75) Inventors: Nils Haustein, Soergenloch (DE); Ulf Troppens, Mainz (DE); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 11/457,087

(22) Filed: Jul. 12, 2006

(65) Prior Publication Data
US 2008/0016128 A1 Jan. 17, 2008

(51) Int. Cl.
G06F 17/00 (2006.01)
G06F 7/00 (2006.01)
G06F 13/00 (2006.01)
G06F 13/28 (2006.01)
G06F 17/20 (2006.01)
G06F 17/21 (2006.01)
G06F 17/24 (2006.01)
G06F 17/26 (2006.01)
G06F 17/25 (2006.01)
G06F 17/22 (2006.01)
G06F 9/30 (2006.01)
G06F 9/40 (2006.01)

(52) U.S. Cl. .................... 707/661; 711/114; 715/231; 712/201

(58) Field of Classification Search .......... 711/114; 370/474; 715/231; 712/201
See application file for complete search history.

(56) References Cited
U.S. PATENT DOCUMENTS
6,154,753 A * 11/2000 McFarland ............ 715/221

| | | | |
|---|---|---|---|
| 6,401,097 B1 * | 6/2002 | McCotter et al. | 707/102 |
| 6,772,164 B2 | 8/2004 | Reinhardt | |
| 6,832,290 B2 | 12/2004 | Todd | |
| 2003/0195895 A1 | 10/2003 | Nowicki et al. | |
| 2003/0221165 A1 | 11/2003 | Young et al. | |
| 2004/0078355 A1 * | 4/2004 | Suresh | 707/1 |
| 2004/0153968 A1 | 8/2004 | Ching et al. | |
| 2004/0193740 A1 * | 9/2004 | Kasmirsky et al. | 710/1 |
| 2005/0086579 A1 * | 4/2005 | Leitner et al. | 715/500 |
| 2005/0235274 A1 * | 10/2005 | Mamou et al. | 717/136 |
| 2006/0004819 A1 * | 1/2006 | Claudatos et al. | 707/101 |
| 2006/0010301 A1 * | 1/2006 | Yagawa | 711/163 |

(Continued)

OTHER PUBLICATIONS

Beigi, et al., "Policy-Based Information Lifecycle Management in a Large-Scale File System", Policies for Distributed Systems and Networks, Sixth IEEE International Workshop on Stockholm, 2005, pp. 139-148.
Stohr, et al., "An Integrative and Uniform Model for Metadata Management in Data Warehousing Environments", Proceedings of the International Workshop on Design and Management of Data Warhouses, 1999, 2 page abstract.

*Primary Examiner*—Kuen S Lu
*Assistant Examiner*—Sabana Rahman
(74) *Attorney, Agent, or Firm*—Dale F. Regelman; Quarles & Brady LLP

(57) ABSTRACT

An apparatus and method to store data are disclosed. The method provides a data storage system comprising a fossilized data management apparatus interconnected with one or more data storage devices. The method provides to the fossilized data management apparatus information and meta data associated with that information, wherein the meta data comprises a format field, a context field, a retention field, a data management field, and a storage management field. The fossilized data management apparatus instructs the one or more data storage devices to write the information to the one or more data storage devices based upon the meta data format field.

15 Claims, 12 Drawing Sheets

U.S. PATENT DOCUMENTS

| | | | |
|---|---|---|---|
| 2006/0015529 A1* | 1/2006 | Yagawa | 707/104.1 |
| 2006/0026219 A1 | 2/2006 | Orenstein et al. | |
| 2007/0088768 A1* | 4/2007 | Passerini et al. | 707/203 |
| 2007/0112890 A1* | 5/2007 | Murase | 707/204 |
| 2007/0198613 A1* | 8/2007 | Prahlad et al. | 707/204 |
| 2007/0214177 A1* | 9/2007 | Fujiwara | 707/104.1 |

* cited by examiner

APPARATUS AND METHOD TO STORE AND MANAGE INFORMATION AND META DATA

FIELD OF THE INVENTION

The invention relates to an apparatus and method to store and manage information and meta data.

BACKGROUND OF THE INVENTION

Storing and managing information which must be retained for long periods of time is becoming more and more challenging for many enterprises and end users. Regulatory requirements have been strengthened, and require that information be retained for longer periods of time in a non-erasable and non-rewritable manner (WORM). In addition, the amount of information is ever increasing. The risk of losing information, or losing access to that information, is increasing due to the complexity of information technology infrastructure. Prior art methods utilize systems for data retention management and archiving consisting of a document management system and an archiving storage.

Typically, a document management system creates indices for the stored information to facilitate later searches and audits. These indices include specifics about the information itself, e.g. its context, creation date, retention times, storage location, relations to other information and user information. Such document management system indices are often referring to as "meta data."

Prior art systems and methods disadvantageously store and manage the meta data and the information separately. Such prior art methods actually render the information vulnerable because by mishandling the indices the document management system may effectively render the information inaccessible. To cure these deficiencies of the prior art, Applicants' fossilized data management apparatus, and method using that system, stores the information and the meta data in a non-rewritable and non-erasable manner in order that both can be accessed, read, and interpreted years later. Alternatively the information and meta data is stored in a rewritable and erasable format. For purposes of this Application, by "fossilized data" Applicants mean information in combination with meta data associated with that information.

SUMMARY OF THE INVENTION

Applicants' invention comprises an apparatus and method to store data. Applicants' method provides a data storage system comprising a fossilized data management apparatus interconnected with one or more data storage devices. The method provides to the fossilized data management apparatus information and meta data associated with that information, wherein the meta data comprises a format field, a context field, a retention field, a data management field, and a storage management field. The fossilized data management apparatus instructs the one or more data storage devices to write the information to the one or more data storage devices based upon the meta data fields.

Applicants' apparatus comprises a document management system, a fossilized data management apparatus in communication with the document management system, and one or more data storage devices in communication with the fossilized data management apparatus. The fossilized data management apparatus comprises a format module, a context module, a retention module, a data management module, and a storage management module.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a fossilized data management apparatus and a method using that fossilized data management apparatus to store and manage information. Applicants' method writes information to data storage media based upon data management policies and retention management policies or context. Further, Applicants' apparatus and method retain and protect information based upon retention management policies or context, manage the data storage media based upon storage management policies or context and format the stored information based upon data format policies.

Figure 1:
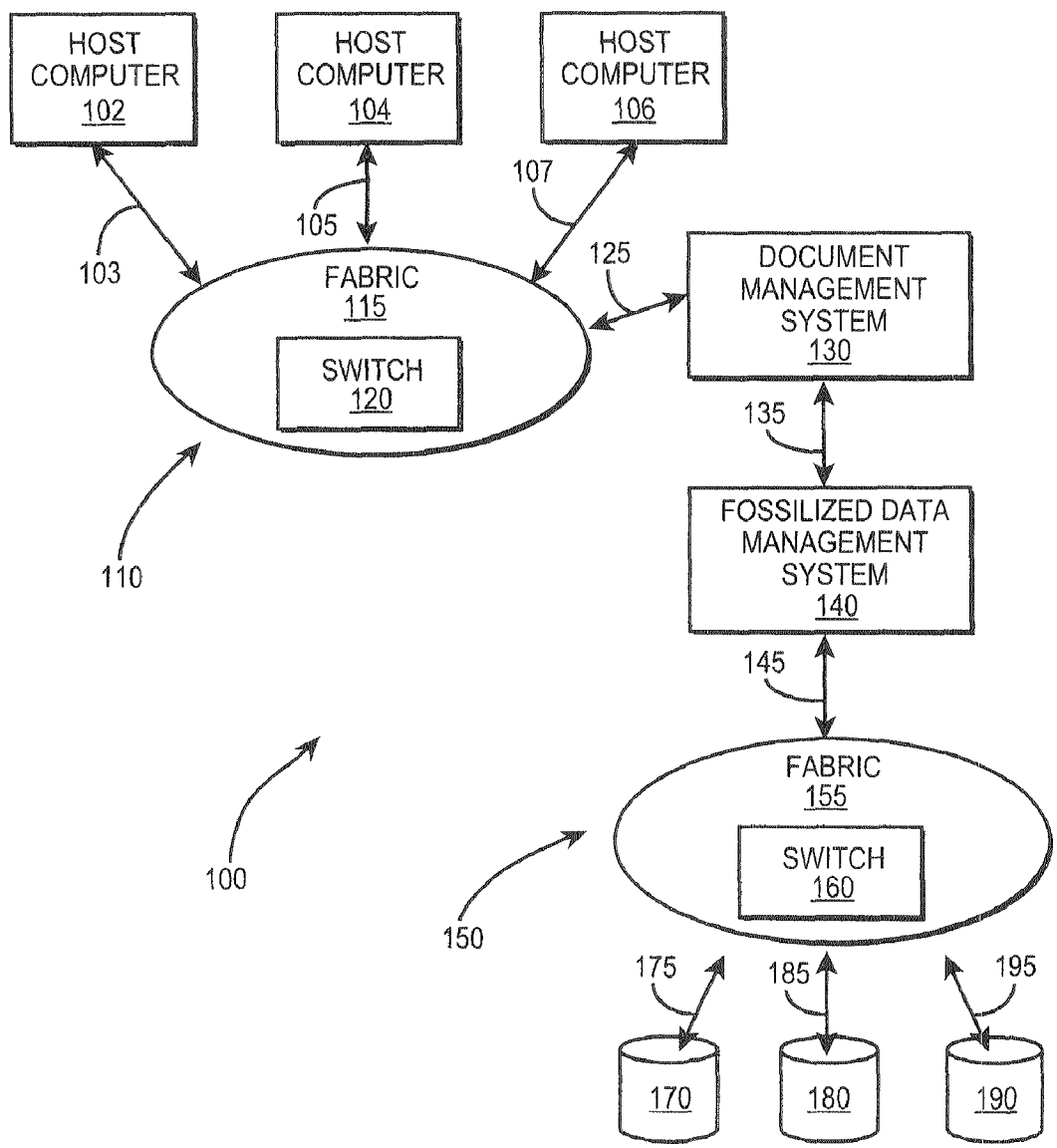
FIG. 1 is a block diagram illustrating one embodiment of Applicants' data storage system.

FIG. 1 is a block diagram that illustrates one embodiment of Applicants' data storage system 100. In the illustrated embodiment of FIG. 1, data storage system 100 comprises storage area network ("SAN") 110 and SAN 150. In other embodiments, Applicants' data storage system 100 comprises a single SAN. In yet other embodiments, Applicants' data storage system 100 does not comprise a SAN.

SAN 110 and SAN 150 are designed as a switched-access-networks, wherein switches 120 and 160, respectively, are used to create a switching fabric 115 and 155, respectively. In certain embodiments, SAN 110 and/or SAN 150 is implemented using Small Computer Systems Interface (SCSI) protocol running over a Fibre Channel ("FC") physical layer. In other embodiments, SAN 110 and/or SAN 150 is implemented utilizing other protocols, such as and without limitation INFINIBAND, FICON, TCP/IP, Ethernet, Gigabit Ethernet, or iSCSI.

One or more switches 115 have the addresses of hosts 102, 104, and 106. As a general matter, host computer 102, 104, and 106, comprise computing devices such as a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

Host computers 102, 104, and 106, are connected to the fabric 115 utilizing communication links 103, 105, and 107, respectively. Communication links 103, 105, and 107 may comprise any type of I/O interface, such as and without limitation a FC loop, a direct attachment to fabric 115, or one or more signal lines used by host computers 102, 104, and 106, to transfer information to and from fabric 1115. In certain embodiments, fabric 115 comprises, for example, one or more FC switches 120 used to connect two or more computer networks. In certain embodiments, FC switches 120 comprise one or more conventional router switches.

Switches 120 interconnect host computers 102, 104, and 106, to document management system 130 via communication link 125. Communication link 125 may comprise any type of I/O interface, for example and without limitation, a Fibre Channel, INFINIBAND, Gigabit Ethernet, Ethernet, TCP/IP, iSCSI, SCSI I/O interface, or one or more signal lines used by FC switch 120 to transfer information through interface 125, to and from document management system 130.

Document management system 130 is interconnected with Applicants' fossilized data management apparatus 140 via communication link 135. Communication link 135 may comprise any type of I/O interface, for example and without limitation, a Fibre Channel, INFINIBAND, Gigabit Ethernet, Ethernet, TCP/IP, iSCSI, SCSI I/O interface, and the like.

In the illustrated embodiment of FIG. 1, SAN 150 interconnects Applicants' fossilized data management apparatus 140 and storage devices 170, 180, and 190. One or more switches 160 have the addresses of storage devices 170, 180, 190, and fossilized data management apparatus interface 145.

Data storage devices 170, 180, and 190, may comprise any known storage devices and/or storage media, using any known storage protocols. In certain embodiments, storage devices 170, 180, and 190, are selected from the group consisting of one or more magnetic disks in combination with the associated disk drive hardware, one or more optical disks in combination with the associated disk drive hardware, one or more magnetic tapes in combination with the associated tape drive hardware, one or more electronic data storage devices, combinations thereof, and the like.

Data storage devices 170, 180, and 190, are connected to fabric 155 via communication links 175, 185, and 195, respectively. Communication links 175, 185, and 195, may comprise any type of I/O interface, such as and without limitation a FC loop, a direct attachment to fabric 155, or one or more signal lines used by data storage devices 170, 180, and 190, to transfer information to and from fabric 155. In certain embodiments, fabric 155 comprises, for example, one or more FC switches 160 used to connect two or more computer networks. In certain embodiments, FC switches 160 comprise one or more conventional router switches.

Switches 160 interconnect data storage devices 170, 180, and 190, to Applicants' fossilized data management apparatus via communication link 145. Communication link 145 may comprise any type of I/O interface, for example and without limitation, a Fibre Channel, INFINIBAND, Gigabit Ethernet, Ethernet, TCP/IP, iSCSI, SCSI I/O interface, or one or more signal lines used by FC switch 160 to transfer information through interface 145, to and from fossilized document management system 140.

In certain embodiments, document management system 130 is collocated with, or integral with, one of more of host computers 102, 104, and/or 106. Because information classification occurs in the document management system, the document management system usually "knows" the information lifecycle, but the archiving storage system does not. Such an information lifecycle includes specifics about type and context of data, retention time, retention policy, and service levels.

In certain embodiments, storage devices 170, 180, and 190, are disposed in an archiving storage system. In certain of these embodiments, Applicants' fossilized data management apparatus is collocated with, or integral with, that archiving storage system. Applicants have found it desirable for the archiving storage to also "know" the information lifecycle because, for example, the archiving storage can prevent the early deletion of data if the associated retention time can be examined. Moreover, the storage facility can manage the information more efficiently if the context of that information can be examined. This enabled efficient information lifecycle management.

As a general matter Applicants' fossilized data management apparatus 140 comprises a format module, a context module, a retention module, a data management module and a storage management module. In the illustrated embodiments of FIG. 2A, and 2C Applicants' fossilized data management apparatus 140 comprises processor 260, microcode/operating system 270 interconnected with processor 260, and memory 280 interconnected with processor 260. Processor 260 utilizes microcode/operating system 270 to operate Applicants' fossilized data management apparatus 140. In certain embodiments, microcode/operating system 270 is written to memory 280.

In certain embodiments, memory 280 comprises one or more magnetic disks in combination with the associated disk drive apparatus. In certain embodiments, memory 280 comprises one or more optical disks in combination with the associated disk drive apparatus. In certain embodiments, memory 280 comprises a device such as a PROM, EPROM, EEPROM, Flash PROM, compactflash, smartmedia, and the like.

Figure 2A:
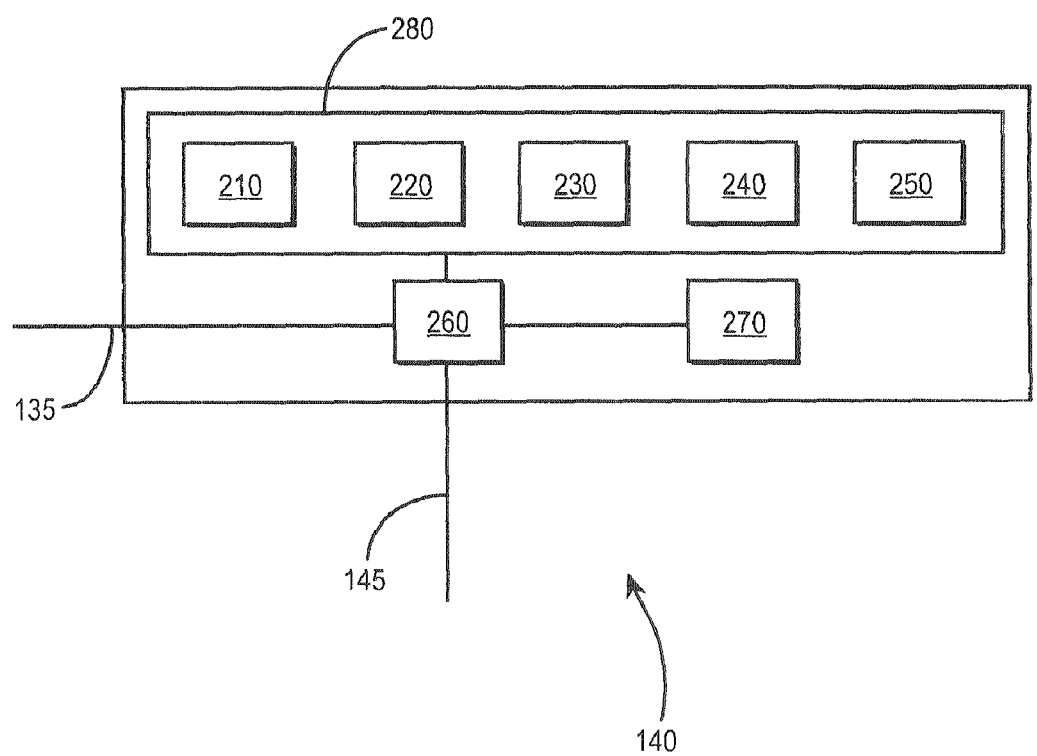
FIG. 2A is a block diagram illustrating one embodiment of Applicants' fossilized data management apparatus.

In the illustrated embodiment of FIG. 2A, Applicants' fossilized data management apparatus 140 further comprises format algorithm 210, context algorithm 220, retention algorithm 230, data management algorithm 240, and storage management algorithm 250. Format algorithm 210 comprises instructions executed by processor 260 to read instructions encoded to format field 310 (FIG. 3A, 3B) written to meta data 305 (FIG. 3A) or to meta data 307 (FIG. 3B), and to cause storage devices 170, 180, and/or 190, to implement those format instructions. Context algorithm 220 comprises instructions executed by processor 260 to read data and/or instructions encoded to context field 320 (FIG. 3A, 3B) written to meta data 305 (FIG. 3A) or to meta data 307 (FIG. 3B), and to cause storage devices 170, 180, and/or 190, to implement those context instructions.

Retention algorithm 230 comprises instructions executed by processor 260 to read instructions encoded to retention field 330 (FIG. 3A, 3B) written to meta data 305 (FIG. 3A) or to meta data 307 (FIG. 3B), and to cause storage devices 170, 180, and/or 190, to implement those retention instructions. Data management algorithm 240 comprises instructions executed by processor 260 to read instructions encoded to data management field 340 (FIG. 3A, 3B) written to meta data 305 (FIG. 3A) or to meta data 307 (FIG. 3B), and to cause storage devices 170, 180, and/or 190, to implement those data management instructions. Storage management algorithm 250 comprises instructions executed by processor 260 to read instructions encoded to storage management field 350 (FIG. 3A, 3B) written to meta data 305 (FIG. 3A) or to meta data 307 (FIG. 3B), and to cause storage devices 170, 180, and/or 190, to implement those storage management instructions.

Figure 2B:
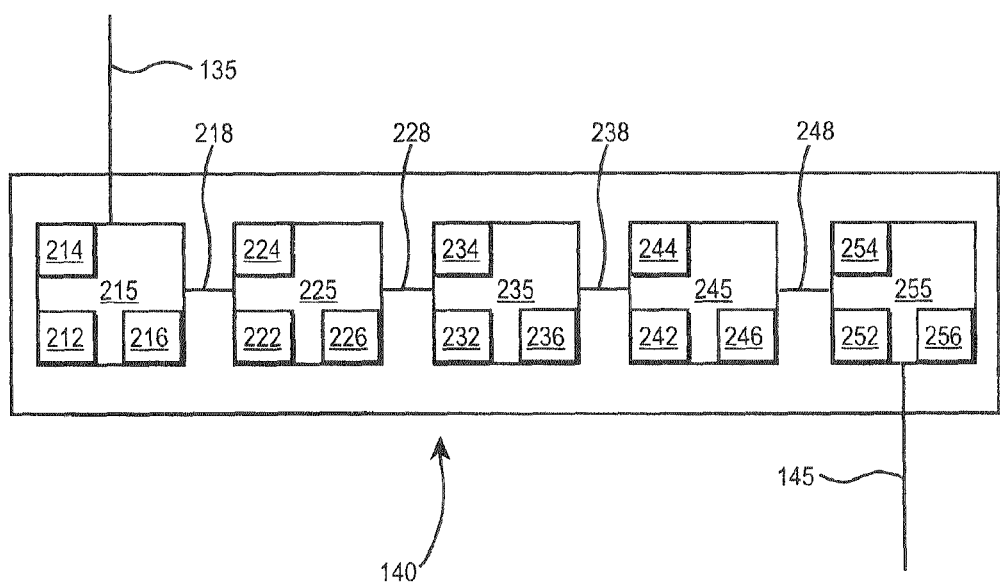
FIG. 2B is a block diagram illustrating a second embodiment of Applicants' fossilized data management apparatus.
Figure 2C:
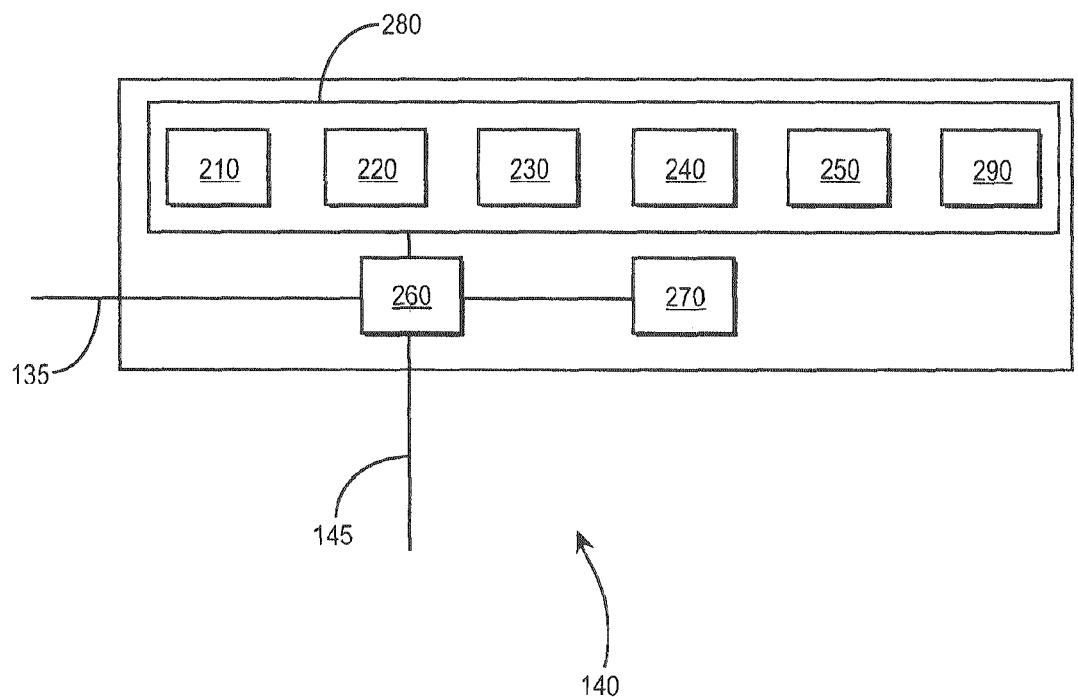
FIG. 2C is a block diagram illustrating a third embodiment of Applicants' fossilized data management apparatus.
Figure 3A:
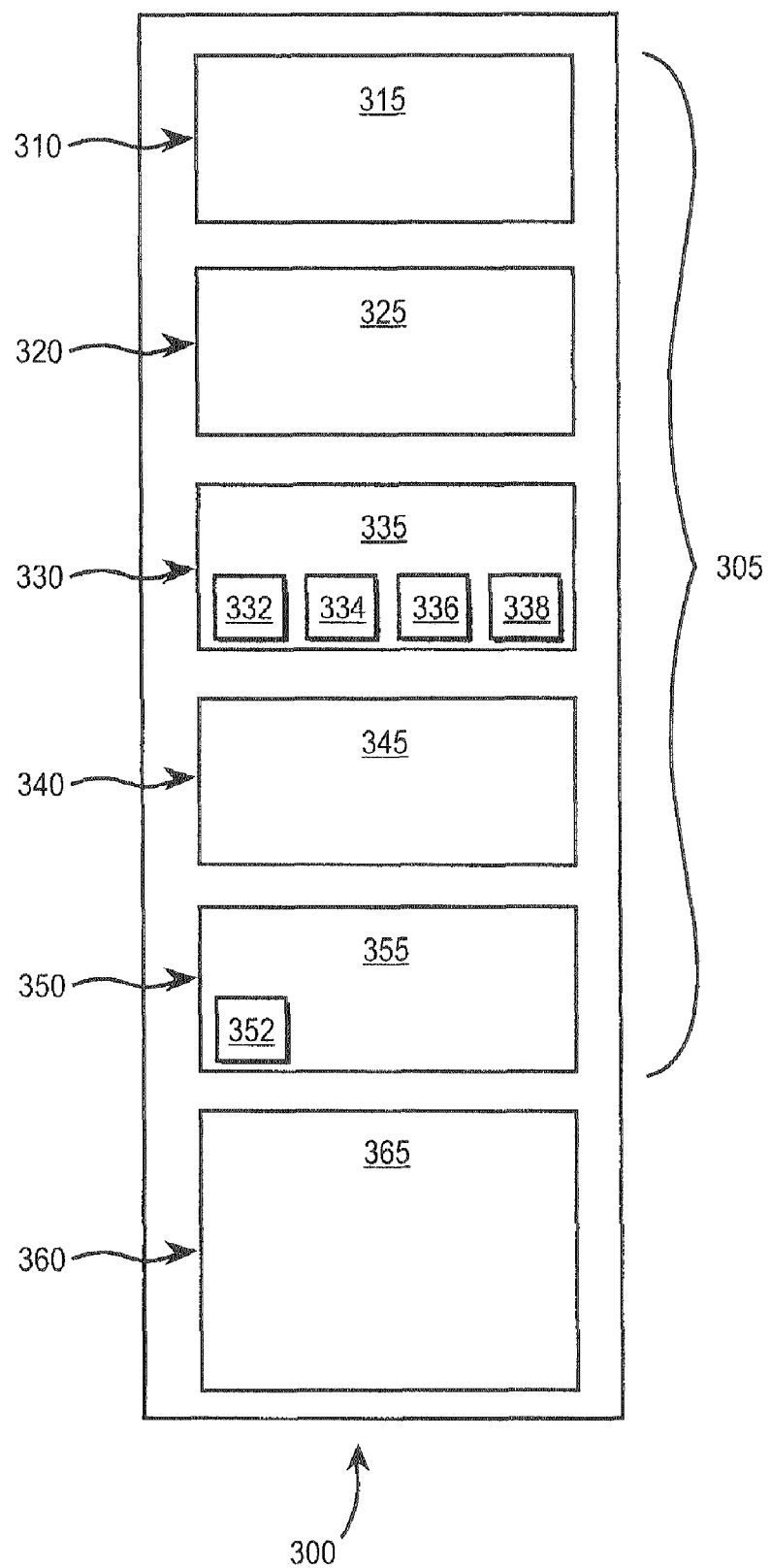
FIG. 3A is a block diagram illustrating one embodiment of Applicants' fossilized data format.
Figure 3B:
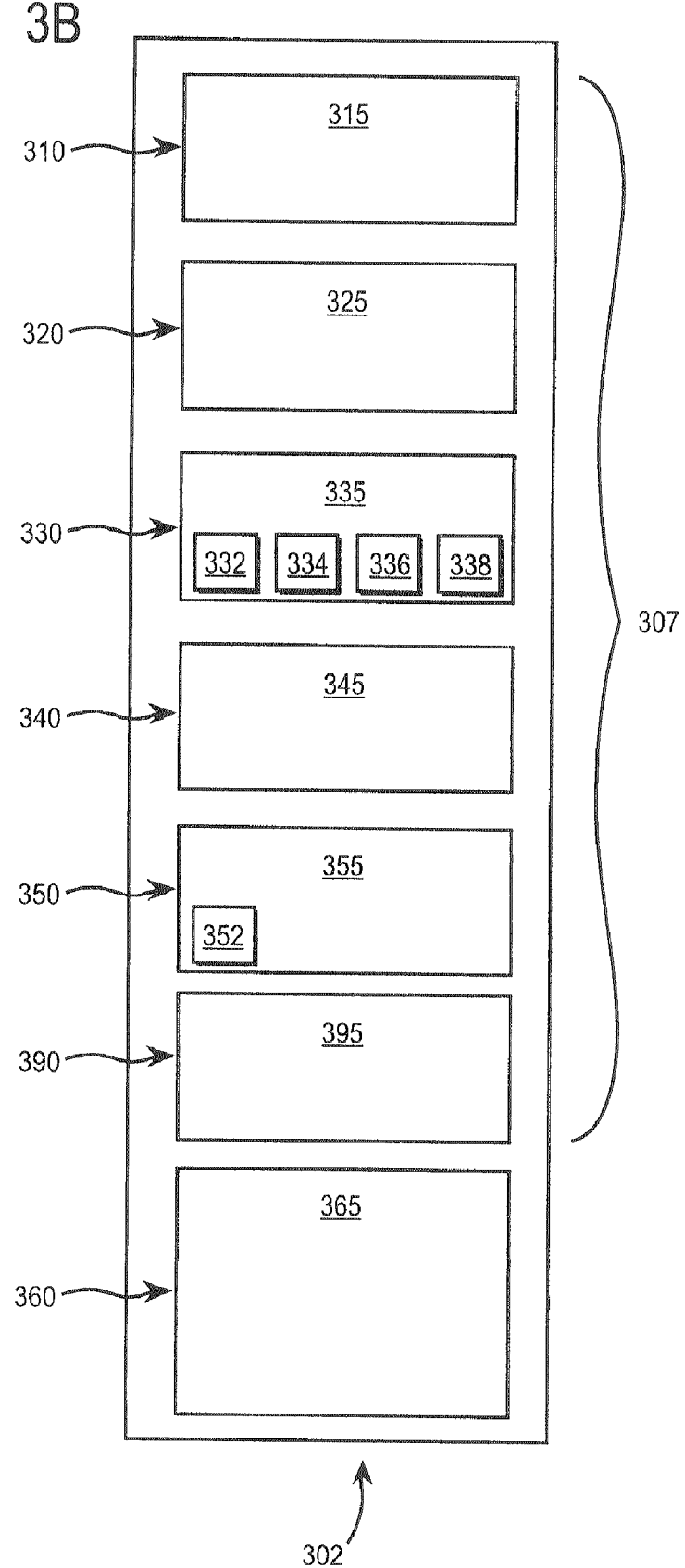
FIG. 3B is a block diagram illustrating a second embodiment of Applicants' fossilized data format.

In the illustrated embodiment of FIG. 2C, Applicants' fossilized data management apparatus 140 further comprises update algorithm 290. Update algorithm 290 detects commands comprising the element "audit" received by Applicants' fossilized data management apparatus 140. Update algorithm 290 records any such audit commands, and the date, time, and origin, of that audit command in an audit field, such as audit field 390 (FIG. 3B).

In the illustrated embodiment of FIG. 2B, Applicants' fossilized data management apparatus 140 comprises format module 215, context module 225, retention module 235, data management module 245, and storage management module 255.

Format module 215 comprises processor 212, memory 214, and instructions 216, wherein instructions 216 are executed by processor 212 to read instructions encoded to format field 310 (FIG. 3A, 3B) written to meta data 305 (FIG. 3A) or to meta data 307 (FIG. 3B), and to cause storage devices 170, 180, and/or 190, to implement those format instructions. In certain embodiments, instructions 216 are encoded to memory 214. Communication link 218 interconnects format module 215 and context module 225.

Context module 225 comprises processor 222, memory 224, and instructions 226, wherein instructions 226 are executed by processor 222 to read instructions encoded to context field 320 (FIG. 3A, 3B) written to meta data 305 (FIG. 3A) or to meta data 307 (FIG. 3B), and to cause storage devices 170, 180, and/or 190, to implement those context instructions. In certain embodiments, instructions 226 are encoded to memory 224. Communication link 228 interconnects context module 225 and retention module 235.

Retention module 235 comprises processor 232, memory 234, and instructions 236, wherein instructions 236 are executed by processor 232 to read instructions encoded to retention field 330 (FIG. 3A, 3B) written to meta data 305 (FIG. 3A) or to meta data 307 (FIG. 3B), and to cause storage devices 170, 180, and/or 190, to implement those retention instructions. In certain embodiments, instructions 236 are encoded to memory 234. Communication link 238 interconnects retention module 235 and data management module 245.

Data management module 245 comprises processor 242, memory 244, and instructions 246, wherein instructions 246 are executed by processor 242 to read instructions encoded to data management field 340 (FIG. 3A, 3B) written to meta data 305 (FIG. 3A) or to meta data 307 (FIG. 3B), and to cause storage devices 170, 180, and/or 190, to implement those data management instructions. In certain embodiments, instructions 246 are encoded to memory 244. Communication link 248 interconnects data management module 245 and storage management module 255.

Storage management module 255 comprises processor 252, memory 254, and instructions 256, wherein instructions 256 are executed by processor 252 to read instructions encoded to storage management field 350 (FIG. 3A, 3B) written to meta data 305 (FIG. 3A) or to meta data 307 (FIG. 3B), and to cause storage devices 170, 180, and/or 190, to implement those storage management instructions. In certain embodiments, instructions 256 are encoded to memory 254.

Figure 2D:
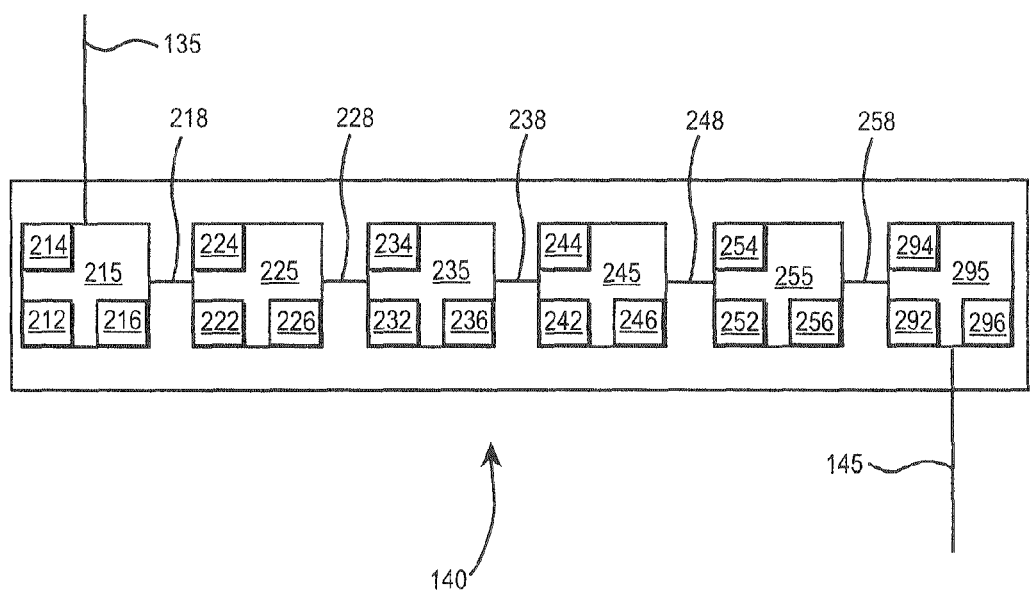
FIG. 2D is a block diagram illustrating a fourth embodiment of Applicants' fossilized data management apparatus.

In the illustrated embodiment of FIG. 2D, Applicants' fossilized data management apparatus 140 further comprises audit module 295. Communication link 258 interconnects storage management module 255 and audit module 295.

Audit module 295 comprises processor 292, memory 294, and instructions 296, wherein instructions 296 are executed by processor 252 to detect commands comprising the element "audit" received by Applicants' fossilized data management apparatus 140. Processor 292 records any such audit commands, and the date, time, and origin, of that audit command in an audit field, such as audit field 390 (FIG. 3B). In certain embodiments, instructions 296 are encoded to memory 294.

In certain embodiments, memory 214, 224, 234, 244, 254, and/or 294, comprises one or more magnetic disks in combination with the associated disk drive apparatus. In certain embodiments, memory 214, 224, 234, 244, 254 and/or 294, comprises one or more optical disks in combination with the associated disk drive apparatus. In certain embodiments, memory 214, 224, 234, 244,254, and/or 294, comprises a device such as a PROM, EPROM, EEPROM, Flash PROM, compactflash, smartmedia, and the like.

Figure 4A:
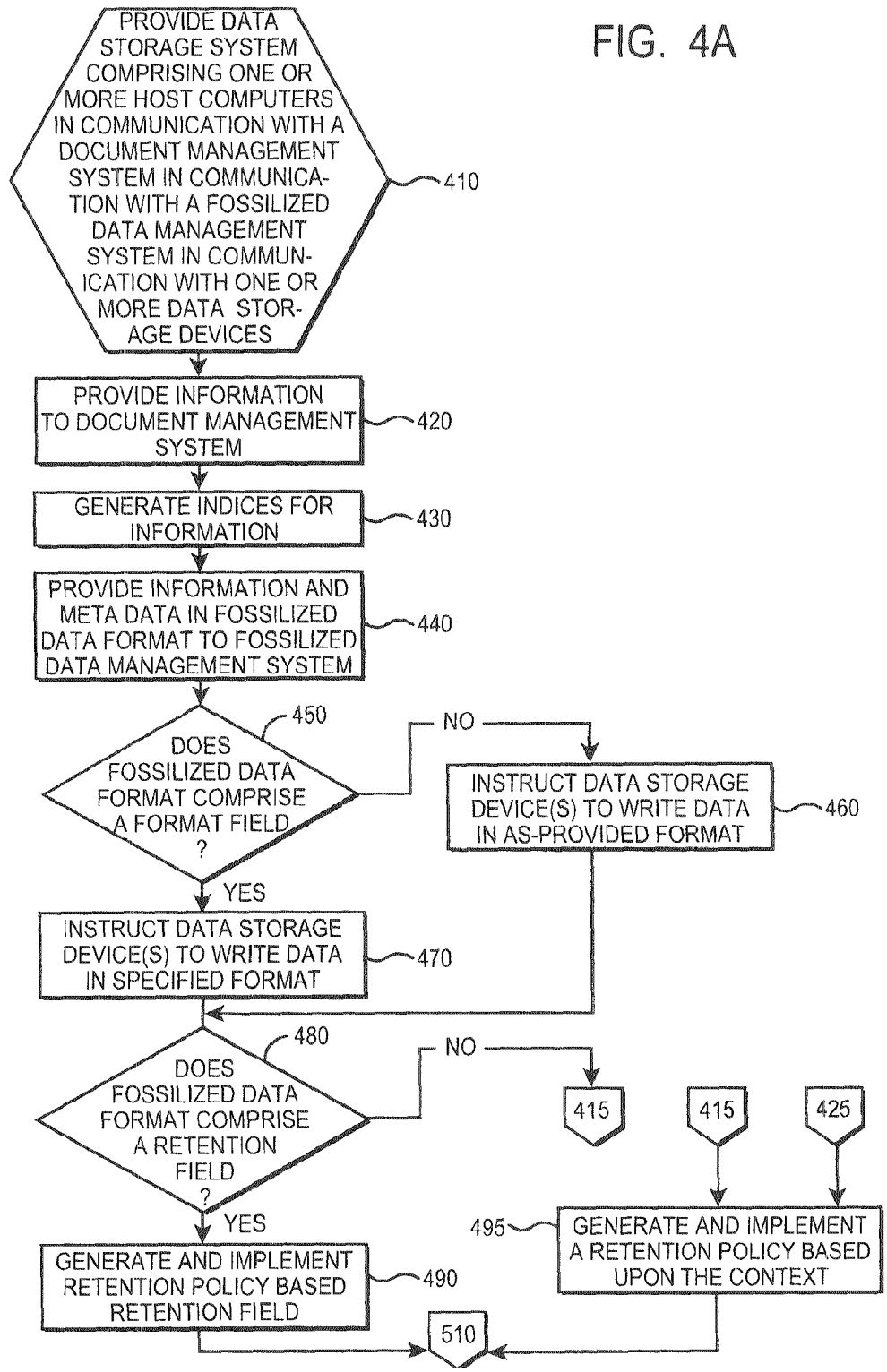
FIG. 4A is a flow chart summarizing the initial steps in Applicants' method to store and manage information using Applicants' fossilized data management apparatus.

Applicants' invention comprises a method to store and manage information using Applicants' fossilized data management apparatus. Referring now to FIGS. 3A and 4A, in step 410 Applicants' method provides a data storage system, such as for example data storage system 100 (FIG. 1), comprising one or more host computers, such as host computers 102 (FIG. 1), 104 (FIG. 1), and 106 (FIG. 1), in communication with a document management system, such as document management system 130 (FIG. 1), which is in communication with a fossilized data management apparatus, such as Applicants' fossilized data management apparatus 140 (FIGS. 1, 2A, 2B), which is in communication with one or more data storage devices, such as data storage devices 170 (FIG. 1), 180 (FIG. 1), and/or 190 (FIG. 1).

In step 420, Applicants' method provides information to the document management system. In certain embodiments, step 420 is performed by one or more host computers.

In step 430, Applicants' method generates indices, i.e. meta data, for the information provided in step 420. In certain embodiments, step 430 is performed by the one or more host computers providing the information. In certain embodiments, step 430 is performed by the document management system.

In step 440, Applicants' method provides the information of step 420 in combination with the meta data of step 430 to Applicants' fossilized data management apparatus, wherein the information and meta data are provided in a fossilized data format, such as fossilized data format 300 (FIG. 3A) or fossilized data format 302 (FIG. 3B).

FIG. 3A recites fossilized data format 300, wherein that fossilized data format 300 is generated by document management system 130 (FIG. 1). Fossilized data format 300 comprises meta data 305 and information 360. Meta data 305 comprises format field 310, context field 320, retention field 330, storage management field 340, and data management field 350.

FIG. 3B recites fossilized data format 302, wherein that fossilized data format 302 is generated by document management system 130 (FIG. 1). Fossilized data format 302 comprises meta data 307 and information 360. Meta data 307 comprises format field 310, context field 320, retention field 330, storage management field 340, data management field 350, and audit field 390.

In certain embodiments, each of meta data fields 310, 320, 330, 340, 350, and optional audit field 390 comprise an identifier, such as identifiers 315, 325, 335, 345, 355, and 395, respectively. In certain embodiments, these identifiers comprise "headers," wherein Applicants' fossilized data management apparatus determines the beginning of each meta data field using that header information. In these embodiments, meta data fields 310, 320, 330, 340, 350, and optional audit field 390, may be arranged in any order.

In other embodiments, meta data fields 310, 320, 330, 340, 350, and optional audit field 390, do not comprise identifiers 325, 325, 335, 345, 355, and 395, respectively. In these embodiments, Applicants' fossilized data management apparatus 140 recognizes meta data fields 310, 320, 330, 340, 350, and optional audit field 390, by the order of arrangement of those meta data fields.

In step 450 Applicants' fossilized data management apparatus examines the fossilized data provided in step 440 and determines if that fossilized data comprises a format field, such as format field 310. In certain embodiments, step 450 is performed by a processor disposed in Applicants' fossilized data storage system. In certain embodiments, step 450 is performed by a processor disposed in a format module disposed within Applicants' fossilized data management apparatus.

Data format field 310 comprises the data format in combination with instructions regarding how this format can be made readable. Format field 310 may specify that information 360 be provided to storage devices 170, 180, and/or 190, and stored by one or more of those storage devices, in a standardized format such as pdf, tiff, jpeg, or information provided in an Open Document Format in compliance with ISO/IEC Standard 26300. In other embodiments, format field 310 specifies a proprietary format, wherein format field 310 comprises instruction-code to decode the information. An example of such an instruction-code comprises MICROSOFT WORD.

Data format field 310 further comprises a format mode 312 comprising instructions used by Applicants' fossilized data management apparatus 140 to determine whether to maintain old formatted data, or in the alternative whether to discard that old formatted data. In certain embodiments, if the protection mode 336 of retention policy 330 is set to PROTECTED or STRONG PROTECTED, then Applicants' fossilized data management apparatus 140 automatically sets format mode 312 to maintain the old copy of data.

If the data format field 310 is updated by the document management system, for example to reflect a new data format, then Applicants' fossilized data management apparatus 140 performs the format conversion automatically to the new format and deletes the old formatted information if instructed. If the information protection mode 336 of the retention policy field 330 is set to PROTECTED or STRONG PROTECTED, then Applicants' fossilized data management apparatus 140 maintains the old copy of the information. If context field 320 is updated, Applicants' fossilized data management apparatus 140 applies the appropriate context policy if other meta data field policies 330, 340, 350 are not set.

If Applicants' method determines in step 450 that the fossilized data does not comprise a format field, then Applicants' method transitions from step 450 to step 460 wherein the method instructs the one or more data storage devices to store the information and meta data in the "as provided" format. Applicants' method transitions from step 460 to step 480. In certain embodiments, step 460 is performed by a processor disposed in Applicants' fossilized data storage system. In certain embodiments, step 460 is performed by a processor disposed in a format module disposed within Applicants' fossilized data management apparatus.

If Applicants' method determines in step 450 that the fossilized data does comprise a format field, then Applicants' method transitions from step 450 to step 470 wherein the method instructs the one or more data storage devices to store the information and the meta data using the specified format. Applicants' method transitions from step 470 to step 480.

In certain embodiments, step 470 is performed by a processor disposed in Applicants' fossilized data storage system. In certain embodiments, step 470 is performed by a processor disposed in a format module disposed within Applicants' fossilized data management apparatus.

In step 480, Applicants' method determines if the fossilized data of step 440 comprises instructions encoded in the retention field. In certain embodiments, step 480 is performed by a processor disposed in Applicants' fossilized data storage system. In certain embodiments, step 480 is performed by a processor and/or algorithm disposed in a retention module disposed within Applicants' fossilized data management apparatus.

Figure 5:
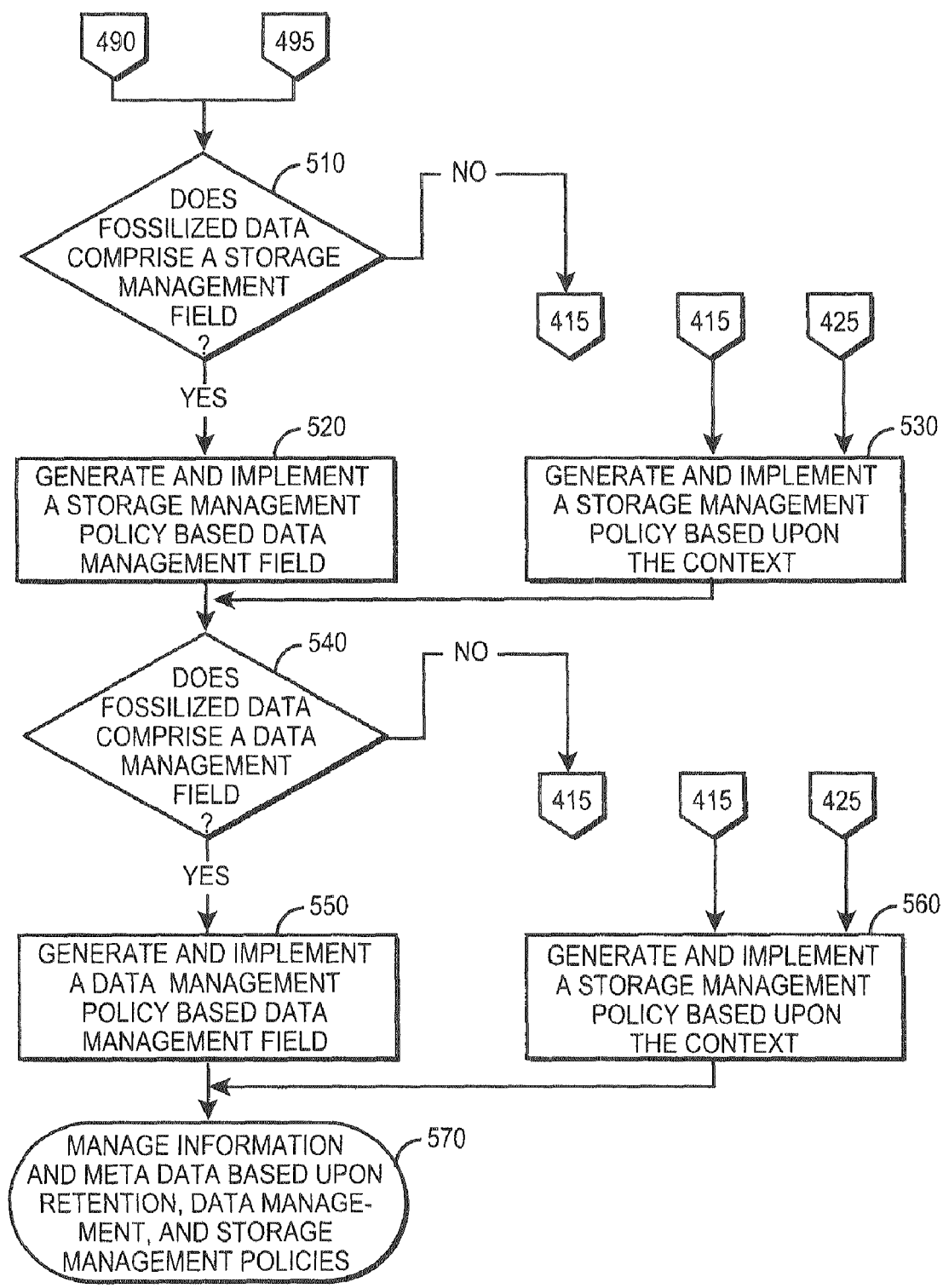
FIG. 5 is a flow chart summarizing additional steps in Applicants' method to store and manage information using Applicants' fossilized data management apparatus.

If Applicants' method determines in step 480 that the fossilized data does comprise a instructions encoded in the retention policy field 330, then Applicants' method transitions from step 480 to step 490 wherein the method generates and implements a retention policy based upon those retention field instructions. Applicants' method transitions from step 490 to step 510 (FIG. 5).

Retention policies included in retention field 330 comprises the retention time 332 for information 360 and retention time 334 for meta data fields 310, 320, 330, 340, and 350. In certain embodiments, retention time 332 and retention time 334 are the same. In other embodiments, retention time 332 and retention time 334 differ. Retention time 332 and retention time 334 may include a simple date and time specifying how long the information and meta has to be retained. In another embodiment the retention time 332 and 334 may include a unlimited retention time. In yet another embodiment the retention time 332 and 334 is started as a result of an event. An event may be triggered by the document management system 130 and may be implemented as a event-command send by the document management system 130 to the fossilized data management system 140 via communication link 135. Retention policy field 330 further comprises protection mode 336 for information 360 and protection mode 338 for meta data 310, 320, 330, 340, and 350.

In certain embodiments, information protection mode 336 is selected from the group consisting of NOT PROTECTED, WEAK PROTECTED, PROTECTED, and STRONG PROTECTED. In certain embodiments, meta data protection mode 338 is selected from the group consisting of NOT PROTECTED, WEAK PROTECTED, PROTECTED, and STRONG PROTECTED. In certain embodiments, information protection mode 336 and meta data protection mode 338 are the same. In other embodiments, information protection mode 336 and meta data protection mode 338 differ.

Protection mode NOT PROTECTED means the information and/or meta data can be read, updated and deleted. Protection mode WEAK PROTECTED means the information can be read but not modified, and meta data fields can be updated based upon the update policies and the old meta data will be discarded. Under the WEAK PROTECTED mode, information and meta data cannot be deleted.

Protection mode PROTECTED means information can read but not modified. Meta data can be updated based upon the update policies, and the old meta data will saved for audit purposes. A reference to the old meta data is stored in the audit field 370 pertaining to the meta data 305 (FIG. 3A)/307 (FIG. 3B). The old meta data can be accessed using a command wherein that command comprises the designation "audit" written therein. The audit command is sent by the document management system 130 to the Applicant's fossilized data management system 140 via communication link 135. As a response to an "audit" command the applicant apparatus presents the information stored in the audit field 370 pertaining to the meta data 370. Under the PROTECTED mode, information and meta data cannot be deleted. In certain embodiments, under the PROTECTED mode information may be converted from a first data format to a different data format. In certain embodiments, the information in the first data format is saved for audit purposes.

Protection mode STRONG PROTECTED means the information and meta data can be read, but not updated or deleted. The STRONG PROTECTED mode freezes the data and meta data upon the store-process.

In the event the retention policy protection mode 336 is set to NON-PROTECTED, then the information is written to erasable media, such as a magnetic disk or tape, or the information is written to rewritable optical media. If any other retention policy is indicated, the information is written to a WORM medium. The WORM- or erasable medium is realized on devices 170, 180 or 190.

In certain embodiments, update policies set forth that updates to the retention field 330 are restricted. For example, information protection mode 336 and meta data protection mode 338 can only be revised to a higher level. In addition, information retention time 336 and meta data retention time 338 can only be decreased if the corresponding protection mode 332 or 334 is set to NOT-PROTECTED. If other protection modes are called out, then information retention time 336 and/or meta data retention time 338 can only be increased.

Meta data is updated when the meta data protection mode 338 so indicates. Based upon the meta data protection mode 338, the old version of the meta data is saved and can be read by the document management system using, for example, an audit command.

Figure 4B:
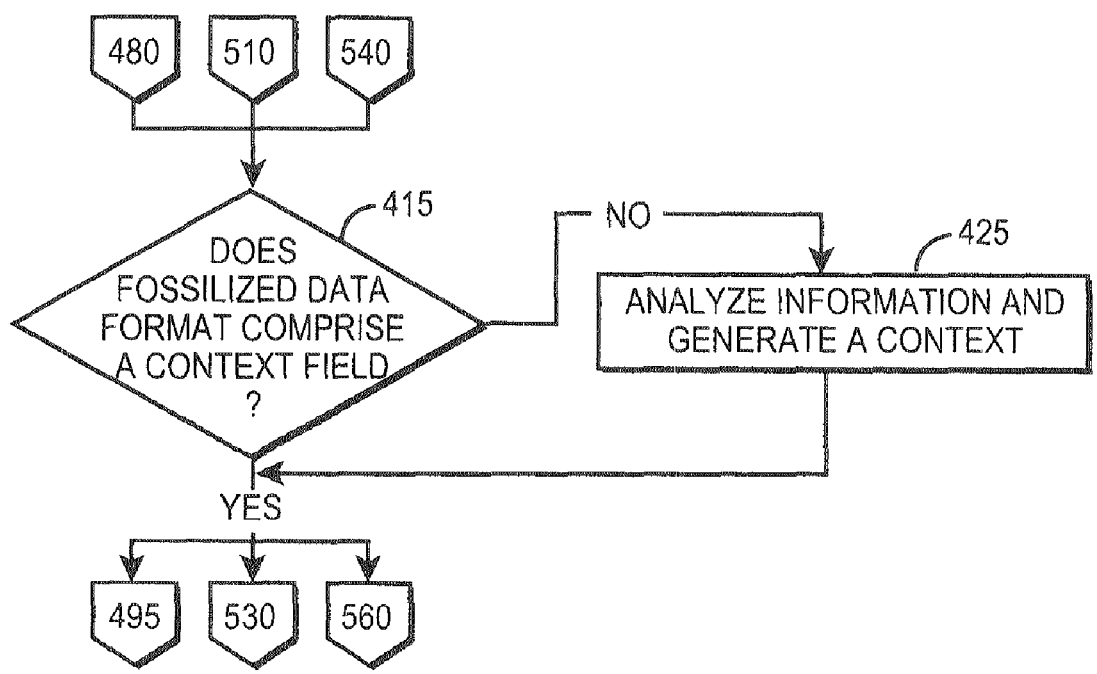
FIG. 4B is a flow chart summarizing additional steps in Applicants' method to store and manage information using Applicants' fossilized data management apparatus.

Referring now to FIGS. 4A and 4B, if Applicants' method determines in step 480 that the fossilized data does not comprise instructions encoded in the retention field, then the method transitions from step 480 to step 415 (FIG. 4B) wherein the method determines if the fossilized data comprises a context field. In certain embodiments, step 415 is performed by a processor and/or algorithm disposed in Applicants' fossilized data storage system. In certain embodiments, step 415 is performed by a processor and/or algorithm disposed in a context module disposed within Applicants' fossilized data management apparatus.

If Applicants' method determines in step 415 that the fossilized data comprises a context field, then the method transitions from step 415 to step 495. Alternatively, if Applicants' method determines in step 415 that the fossilized data does not comprise a context field, then the method transitions from step 415 to step 425 wherein the method generates a context by analyzing the information provided in step 440.

In certain embodiments, step 425 is performed by a processor and/or algorithm disposed in Applicants' fossilized data storage system. In certain embodiments, step 425 is performed by a processor and/or algorithm disposed in a context module disposed within Applicants' fossilized data management apparatus.

Applicants' method transitions from step 425 to step 495 (FIG. 4A) wherein the method analyzes data/instructions encoded to the context field, or uses the context generated in step 425, to generate a retention policy for the information provided in step 440. Table I summarizes one embodiment of Applicants' method wherein a retention policy is set in step 495 by Applicants' fossilized data management apparatus 140 using the provided context field of the meta data provided in step 440 (FIG. 4A), or using or the context generated in step 425 (FIG. 4B). For example, referring to table I second row, the retention policy for e-mail information (reflected in the context field 320) includes that the information and meta data is to be kept for 1 year in a PROTECTED mode. Table I is stored in the Applicant's apparatus. Table I is user configurable.

TABLE I

| Context | Retention Policy | Data Management Policy | Storage Management Policy |
| --- | --- | --- | --- |
| email | One Year PROTECTED | NEARLINE | No Migration Copy to tape |
| Account data | Seven Years STRONG PROTECTED | ONLINE Disaster YES | Migration to NEARLINE after one year with Disaster YES |
| Scanned Document | Twenty Years PROTECTED | NEARLINE | Migration after two years to OFFLINE with copy to tape |

In certain embodiments, step 495 is performed by a processor and/or algorithm disposed in Applicants' fossilized data storage system. In certain embodiments, step 495 is performed by a processor and/or algorithm disposed in a retention module disposed within Applicants' fossilized data management apparatus. Applicants' method transitions from step 495 to step 510 (FIG. 5).

Referring now to FIGS. 4B and 5, in step 510 Applicants' method determines if the fossilized data of step 440 comprises instructions encoded in the storage management field. In certain embodiments, step 510 is performed by a processor and/or algorithm disposed in Applicants' fossilized data storage system. In certain embodiments, step 510 is performed by a processor and/or algorithm disposed in a storage management module disposed within Applicants' fossilized storage management system.

If Applicants' method determines in step 510 that the fossilized data does comprise instructions encoded in the storage management field 330, then Applicants' method transitions from step 510 to step 520 wherein the method generates and implements a storage management policy based upon the storage management field instructions recited in the fossilized data. Applicants' method transitions from step 520 to step 540.

Storage management field 340 comprises instructions regarding migration of the information to differing storage-cost tiers. For purposes of this Application, a "lower storage-cost tier" comprises a storage technology which is less expensive to implement and/or maintain. For example, migration information from a RAID storage protocol to a non-RAID storage protocol comprises migrating that data to a lower storage-cost tier. If storage management policy 340 indicates migration of the information to a lower storage-cost tier after a designated time interval, then Applicants' fossilized data management apparatus 140 executes the migration upon the expiration of the designated time interval. Storage management field 340 also includes instructions regarding copy of information and meta data. Copy instructions result in creating a copy of the information and/or meta data to another storage medium.

Referring now to FIGS. 4B and 5, if Applicants' method determines in step 510 that the fossilized data does not comprise a storage management field, then the method transitions from step 510 to step 415 (FIG. 4B) wherein the method determines if the fossilized data comprises a context field. In certain embodiments, step 415 is performed by a processor and/or algorithm disposed in Applicants' fossilized data storage system. In certain embodiments, step 415 is performed by a processor and/or algorithm disposed in a context module disposed within Applicants' fossilized data management apparatus.

If Applicants' method determines in step 415 that the fossilized data comprises a context field, then the method transitions from step 415 to step 530. Alternatively, if Applicants' method determines in step 415 that the fossilized data does not comprise a context field, then the method transitions from step 415 to step 425 wherein the method generates a context by analyzing the information provided in step 440.

In certain embodiments, step 425 is performed by a processor and/or algorithm disposed in Applicants' fossilized data storage system. In certain embodiments, step 425 is performed by a processor and/or algorithm disposed in a context module disposed within Applicants' fossilized data management apparatus.

Applicants' method transitions from step 425 to step 530 wherein the method analyzes data/instructions encoded to the context field, or uses the context generated in step 425, to generate a storage management policy for the information provided in step 440. Table I summarizes one embodiment of Applicants' method wherein a storage management policy is set in step 530 by Applicants' fossilized data management apparatus 140 using the provided context field of the meta data provided in step 440 (FIG. 4A), or using or the context generated in step 425 (FIG. 4B). For example, referring to table I second row, the storage management policy for e-mail information (reflected in the context field 320) includes that the information and meta data is not to be migrated and copied to tape. This is the storage management policy being derived based on the context and table I is implemented in step 570. Table I is stored in the Applicant's apparatus. Table I is user configurable.

Applicants' method transitions from step 530 to step 540 wherein the method determines if the fossilized data of step 440 comprises instructions encoded in the data management field. In certain embodiments, step 540 is performed by a processor and/or algorithm disposed in Applicants' fossilized data storage system. In certain embodiments, step 540 is performed by a processor and/or algorithm disposed in a data management module disposed within Applicants' fossilized storage management system.

If Applicants' method determines in step 540 that the fossilized data does comprise instructions encoded in the data management field 350, then Applicants' method transitions from step 540 to step 550 wherein the method generates and implements a data management policy based upon the data management field instructions. Applicants' method transitions from step 550 to step 570.

Data management field 350 comprises instructions that Applicants' fossilized data management apparatus 140 uses in step 550 to set the service levels 352 for information 360. In certain embodiments, service levels 352 comprise an information availability level selected from the group consisting of HIGH, MEDIUM, and LOW, a disaster protection level selected from the group consisting of YES and NO, and an access time level selected from the group consisting of ONLINE, NEARLINE, and OFFLINE.

In certain embodiments, an ONLINE designation means the information can be accessed in less than about 1 second. In certain embodiments, a NEARLINE designation means the information can be accessed in about 5 seconds to about 10 seconds. In certain embodiments, an OFFLINE designation means the information can be accessed 10 seconds or longer, typically about 30 seconds.

If service levels 352 comprise an information availability level of HIGH, then Applicants' fossilized data management apparatus 140 writes the information to a storage system utilizing a RAID protocol, or to a clustered storage system. If service levels 352 comprise a disaster protection level of YES, then Applicants' fossilized data management apparatus 140 writes the information to a storage system which creates a secondary copy of the data. If service levels 352 comprise an ONLINE access level, then Applicants' fossilized data management apparatus 140 writes the information to a magnetic disk. If service levels 352 comprise an NEARLINE access level, then Applicants' fossilized data management apparatus 140 writes the information to an optical medium or to a short tape. If service levels 352 comprise an OFFLINE access level, then Applicants' fossilized data management apparatus 140 writes the information to a full length magnetic tape.

If the field storage management policy 340 is updated, then Applicants' fossilized data management apparatus 140 implements those updates to the stored information. For example, if the data management policy is updated to HIGH, then Applicants' fossilized data management apparatus 140 migrates the data and meta data to high available storage. As another example, if an updated storage management policy 340 indicates migration of the information to tape after two years, then Applicants' fossilized data management apparatus 130 applies this updated policy to all information which has not been migrated. In certain embodiments, previously migrated data which does not satisfy the updated policy, i.e. two years on disk, is staged back into disk from tape.

Referring now to FIGS. 4B and 5, if Applicants' method determines in step 540 that the fossilized data does not comprise a data management field, then the method transitions from step 540 to step 415 (FIG. 4B) wherein the method determines if the fossilized data comprises a context field. In certain embodiments, step 415 is performed by a processor and/or algorithm disposed in Applicants' fossilized data storage system. In certain embodiments, step 415 is performed by a processor and/or algorithm disposed in a context module disposed within Applicants' fossilized data management apparatus.

If Applicants' method determines in step 415 that the fossilized data comprises a context field, then the method transitions from step 415 to step 560. Alternatively, if Applicants' method determines in step 415 that the fossilized data does not comprise a context field, then the method transitions from step 415 to step 425 wherein the method generates a context by analyzing the information provided in step 440.

In certain embodiments, step 425 is performed by a processor and/or algorithm disposed in Applicants' fossilized data storage system. In certain embodiments, step 425 is performed by a processor and/or algorithm disposed in a context module disposed within Applicants' fossilized data management apparatus.

Applicants' method transitions from step 425 to step 560 wherein the method analyzes data/instructions encoded to the context field, or uses the context generated in step 425, to generate a data management policy for the information provided in step 440. Table I summarizes one embodiment of Applicants' method wherein a data management policy is set in step 560 by Applicants' fossilized data management apparatus 140 using the provided context field of the meta data provided in step 440 (FIG. 4A), or using or the context generated in step 425 (FIG. 4B). For example, referring to table I second row, the data management policy for e-mail information (reflected in the context field 320 or analyzed in step 425) includes that the information and meta data is to be stored on NEARLINE storage. This is the data management policy being derived based on the context and table I is implemented in step 570. Table I is stored in the Applicant's apparatus. Table I is user configurable.

Applicants' method transitions from step 560 to step 570 wherein the method manages the information and meta data using the retention policy of step 490 or step 495, the storage management policy of step 520 or step 530, and the data management policy of step 550 or step 560. In certain embodiments, step 570 is performed by a processor and/or algorithm disposed in Applicants' fossilized data storage system. In certain embodiments, step 570 is performed by one or more processors and/or one or more algorithms disposed in a retention module, and/or a storage management module, and/or a data management module, disposed within Applicants' fossilized storage management system.

Figure 6A:
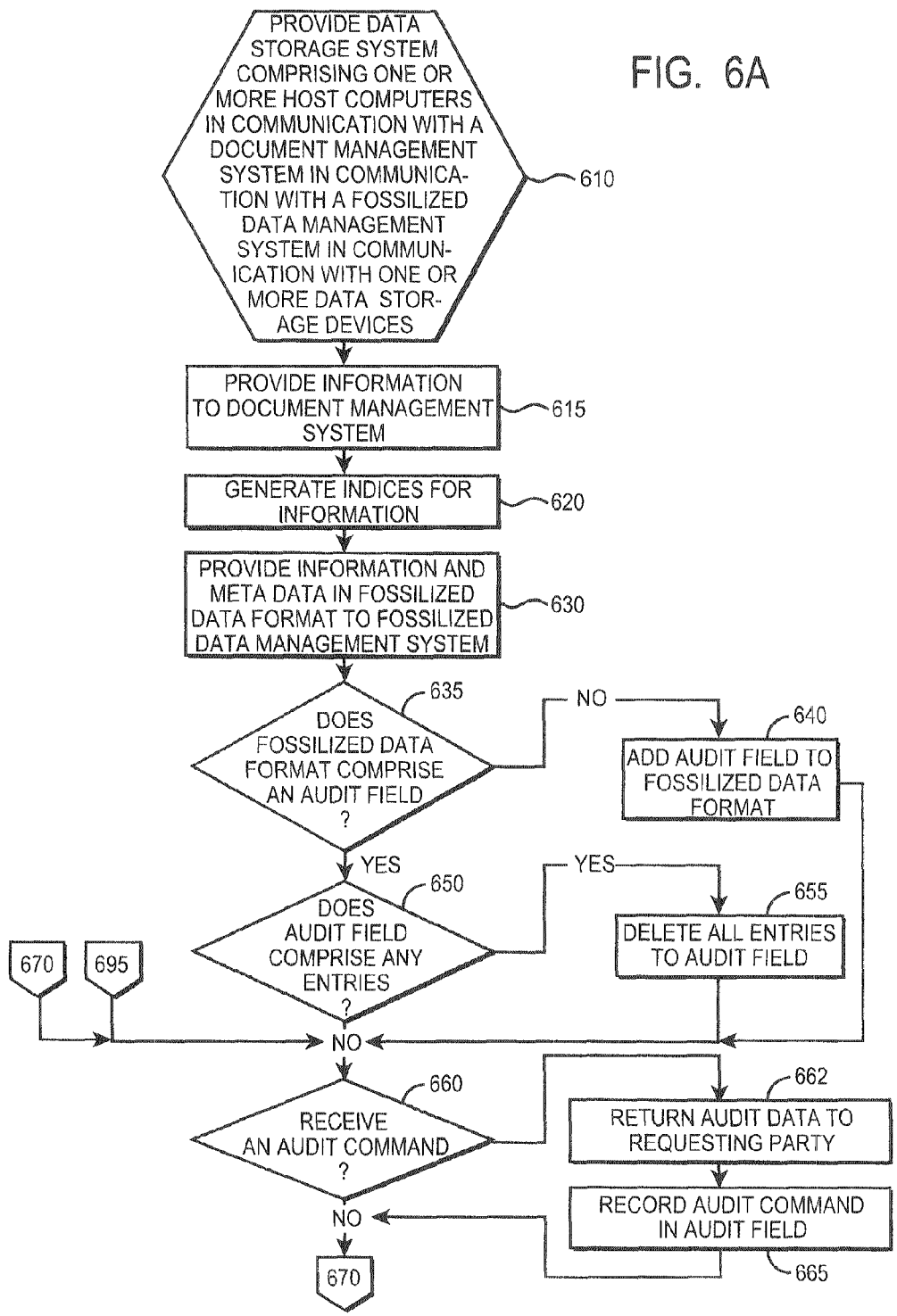
FIG. 6A is a flow chart summarizing the steps in Applicants' method to manage an optional audit field disposed in the fossilized data format of FIG. 3B.

In certain embodiments, Applicants' apparatus and method records audits of stored meta data and/or stored information. In certain embodiments, Applicants' method further records updates to one or more information and/or meta data policies, such as the format policy, retention policy, data management policy, and/or storage management policy. Referring now to FIGS. 3B and 6A, in step 610 Applicants' method provides a data storage system, such as for example data storage system 100 (FIG. 1), comprising one or more host computers, such as host computers 102 (FIG. 1), 104 (FIG. 1), and 106 (FIG. 1), in communication with a document management system, such as document management system 130 (FIG. 1), which is in communication with a fossilized data management apparatus, such as Applicants' fossilized data management apparatus 140 shown in FIG. 2C or 2D, which is in communication with one or more data storage devices, such as data storage devices 170 (FIG. 1), 180 (FIG. 1), and/or 190 (FIG. 1).

In step 615, Applicants' method provides information to the document management system. In certain embodiments, step 615 is performed by one or more host computers.

In step 620, Applicants' method generates indices, i.e. meta data, for the information provided in step 615. In certain embodiments, step 620 is performed by the one or more host computers providing the information. In certain embodiments, step 620 is performed by the document management system.

In step 630, Applicants' method provides the information of step 615 in combination with the meta data of step 620 to Applicants' fossilized data management apparatus, wherein the information and meta data are provided in a fossilized data format, such as fossilized data format 307 (FIG. 3B).

In step 635 Applicants' fossilized data management apparatus examines the fossilized data provided in step 630 and determines if that fossilized data comprises an audit field, such as format field 390 (FIG. 3B). In certain embodiments, step 635 is performed by a processor disposed in Applicants' fossilized data storage system. In certain embodiments, step 635 is performed by a processor disposed in an audit module disposed within Applicants' fossilized data management apparatus.

If Applicants' method determines in step 635 that the fossilized data of step 630 does not comprise an audit field, then the method transitions from step 635 to step 640 wherein the method adds an audit field, such as audit field 390 (FIG. 3B) to the fossilized data provided in step 630. Applicants' method transitions from step 640 to step 660.

If Applicants' method determines in step 635 that the fossilized data of step 630 does comprise an audit field, then the method transitions from step 635 to step 650 wherein the method determines if the audit field comprises any entries. In certain embodiments, step 635 is performed by a processor disposed in Applicants' fossilized data storage system. In certain embodiments, step 635 is performed by a processor disposed in an audit module disposed within Applicants' fossilized data management apparatus.

If Applicants' method determines in step 650 that the audit field does comprise one or more entries, then the method transitions from step 650 to step 655 wherein the method deletes all entries to the audit field. In certain embodiments, step 655 is performed by a processor disposed in Applicants' fossilized data storage system. In certain embodiments, step 655 is performed by a processor disposed in an audit module disposed within Applicants' fossilized data management apparatus.

Applicants' method transitions from step 655 to step 660 wherein the method determines if an audit command is received. In certain embodiments, step 660 is performed by a processor disposed in Applicants' fossilized data storage system. In certain embodiments, step 660 is performed by a processor disposed in an audit module disposed within Applicants' fossilized data management apparatus.

If Applicants' method determines in step 660 that an audit command is received, then the method transitions from step 660 to 662 wherein the method performs the requested audit, generates audit data, and provides that audit data to the requesting party. In certain embodiments, step 662 is performed by a processor disposed in Applicants' fossilized data storage system. In certain embodiments, step 662 is performed by a processor disposed in an audit module disposed within Applicants' fossilized data management apparatus.

Applicants' method transitions from step 662 to step 665 wherein the method records the audit command in the audit field, such as audit field 390 (FIG. 3B). In certain embodiments, step 665 is performed by a processor disposed in Applicants' fossilized data storage system. In certain embodiments, step 665 is performed by a processor disposed in an audit module disposed within Applicants' fossilized data management apparatus. Applicants' method transitions from step 665 to step 670.

If Applicants' method determines in step 660 that an audit command was not received, then the method transitions from step 660 to step 670 (FIG. 6B) wherein the method determines if an update request has been received. In certain embodiments, the update request of step 670 comprises a meta data update. In certain embodiments, the update request of step 670 comprises an information update. In certain embodiments, step 670 is performed by a processor disposed in an audit module disposed within Applicants' fossilized data management apparatus.

If Applicants' method determines in step 670 that an update request has not been received, then the method transitions from step 670 to step 660 and continues to monitor for audit commands. Alternatively, if Applicants' method determines in step 670 that an update request has been received, then the method transitions from step 670 to step 680 wherein the method determines whether to allow the update request of step 670.

The determination of step 680 is based on the protection mode 336 of retention policy 330 pertaining the information 360, and protection mode 338 of retention policy 330 pertaining to meta data 305/307. For example, the retention mode PROTECTED does not allow changes to the meta data/or information. On the other hand, the protection mode NOT PROTECTED does allow changes to information and/or meta data. In certain embodiments, step 680 is performed by a processor disposed in an audit module disposed within Applicants' fossilized data management apparatus.

If Applicants' method determines in the step 680 that the update request of step 670 is not allowed, then the method transitions from step 680 to step 685 wherein the method rejects the update request of step 670. In certain embodiments, step 685 further comprises providing a message to the user generating the update request of step 670, wherein that message comprises a notification that the update request is rejected. In certain embodiments, step 685 is performed by a processor disposed in an audit module disposed within Applicants' fossilized data management apparatus. Applicants' method transitions from step 685 to step 695.

Alternatively, if Applicants' method determines in the step 680 that the update request of step 670 is allowed, then the method transitions from step 680 to step 690 wherein the method applies the requested update to the meta data and/or information. In certain embodiments, step 690 is performed by one or more processors disposed in one or more modules disposed within Applicants' fossilized data management apparatus.

Applicants' method transitions from step 690 to step 695 wherein the method records in the audit field 390 (FIG. 3B) the update request of step 670, and the decision of step 680. In certain embodiments, step 695 comprises recording in the audit field 390 the day and time the audit request was received, the identity of the user requesting the update, the update itself, and the result of the completion of the update. In certain embodiments, step 695 is performed by a processor disposed in an audit module disposed within Applicants' fossilized data management apparatus. Applicants' method transitions from step 695 to step 660, and continues as described herein.

The embodiments of Applicants' method recited in FIGS. 4A, 4B, 5, 6A and/or 6B, may be implemented separately.

Moreover, in certain embodiments, individual steps recited in FIGS. 4A, 4B, 5, 6A and/or 6B, may be combined, eliminated, or reordered.

Figure 6B:
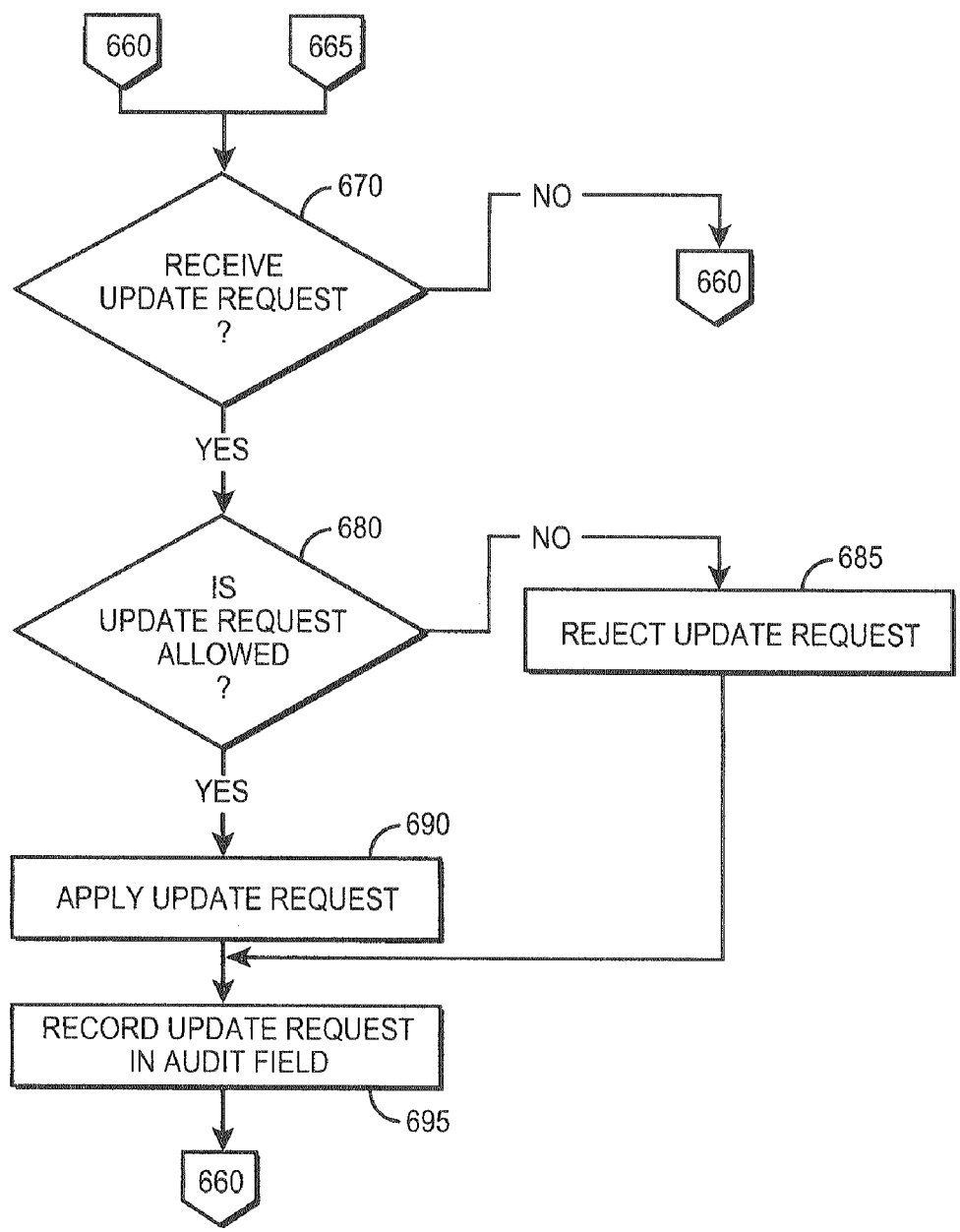
FIG. 6B is a flow chart summarizing the steps in Applicants' method to manage update requests for meta data and information.

In certain embodiments, Applicants' invention includes instructions residing in memory, such as for example memory 280 (FIG. 2A), or memory 214 (FIG. 2B), and/or memory 224 (FIG. 2B), and/or memory 234 (FIG. 2B), and/or memory 244 (FIG. 2B), and/or memory 254 (FIG. 2B), where those instructions are executed by processor 260 (FIG. 2A), or processor 212, and/or processor 222, and/or processor 234, and/or processor 242, and/or processor 252, respectively (FIGS. 3A, 3B), to perform one or more of steps 450, 460, 470, 480, 490, and 495, recited in FIG. 4A, and/or one or more of steps 415 and 425 recited in FIG. 4B, and/or one or more of steps 510, 520, 530, 540, 550, 560, and 570, recited in FIG. 5, and/or one or more of steps 635, 640, 650, 655, 660, 665, recited in FIG. 6A, and/or one or more of steps 670, 680, 685, 690, and/or 695, recited in FIG. 6B.

In other embodiments, Applicants' invention includes instructions residing in any other computer program product, where those instructions are executed by a computer external to, or internal to, system 100, to perform one or more of steps 450, 460, 470, 480, 490, and 495, recited in FIG. 4A, and/or one or more of steps 415 and 425 recited in FIG. 4B, and/or one or more of steps 510, 520, 530, 540, 550, 560, and 570, recited in FIG. 5, and/or one or more of steps 635, 640, 650, 655, 660, 665, recited in FIG. 6A, and/or one or more of steps 670, 680, 685, 690, and/or 695, recited in FIG. 6B. In either case, the instructions may be encoded to an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to store information, comprising the steps of:
providing a data storage system comprising a fossilized data management apparatus interconnected with one or more data storage devices, wherein said fossilized data management apparatus comprises a format algorithm comprising instructions to read a format field written to meta data, a context algorithm comprising instructions to read a context field written to meta data, a retention algorithm comprising instructions to read a retention field written to meta data, a data management algorithm comprising instructions to read a data management field written to meta data, and a storage management algorithm comprising instructions to read a storage management field written to meta data;
providing information and meta data associated with said information to said fossilized data management apparatus using a fossilized data format;
wherein:
said meta data does not comprise meta data field identifiers;
said fossilized data management apparatus recognizes a meta data format field, a meta data context field, a meta data retention field, a meta data storage management field, a meta data data management field, and a meta data audit field, by the order of those meta data fields;

said information follows said meta data audit field;

said format field recites a format for writing said information to said one or more data storage devices;

said retention field recites a retention time and a protection mode for said information and a retention time and a protection mode for said meta data, wherein said retention time for said information may differ from said retention time for said meta data, and wherein said protection mode for said information may differ from said protection mode for said meta data;

said data management field recites an information availability level selected from the group consisting of high, medium, and low;

said data management field further recites an access time level selected from the group consisting of less than 1 second, less than 10 seconds, and greater than 10 seconds;

operative if said data management field recites a high information availability level, storing said information utilizing a RAID protocol;

instructing by said fossilized data management apparatus said one or more data storage devices to write said information to said one or more data storage devices based upon said meta data format field.

2. The method of claim 1, further comprising the steps of:
determining if said meta data comprises instructions encoded in said retention field,
operative if said meta data does not comprise instructions encoded in said retention field, generating by said fossilized data management apparatus a retention policy based upon said context field.

3. The method of claim 1, wherein said generating a retention policy further comprises generating an information protection mode and generating a meta data protection mode, wherein said information protection mode is selected from the group consisting of Not Protected, Weak Protected, Protected, and Strong Protected, and wherein said meta data protection mode is selected from the group consisting of Not Protected, Weak Protected, Protected, and Strong Protected.

4. The method of claim 1, further comprising the steps of:
determining if said meta data comprises instructions encoded in said data management field,
operative if said meta data does not comprise instructions encoded in said data management field, generating by said fossilized data management apparatus a data management policy based upon said context field.

5. The method of claim 4, wherein said generating a data management policy comprises generating service levels for said information, wherein said service levels comprise an information availability level selected from the group consisting of HIGH, MEDIUM, and LOW.

6. The method of claim 1, further comprising the steps of:
determining if said meta data comprises instructions encoded in said storage management field,
operative if said meta data does not comprise instructions encoded in said storage management field, generating by said fossilized data management apparatus a storage management policy based upon said context field.

7. An information storage medium encoding a computer program product, said computer program product being usable with a programmable computer processor to store information using one or more interconnected data storage devices, comprising:

a format algorithm comprising instructions to read a format field written to meta data;

a context algorithm comprising instructions to read a context field written to meta data;

a retention algorithm comprising instructions to read a retention field written to meta data, wherein said retention field recites a retention time and a protection mode for said information and a retention time and a protection mode for said meta data, wherein said retention time for said information may differ from said retention time for said meta data, and wherein said protection mode for said information may differ from said protection mode for said meta data;

a data management algorithm comprising instructions to read a data management field written to meta data;

a storage management algorithm comprising instructions to read a storage management field written to meta data;

computer readable program code which causes said programmable computer processor to receive information and meta data associated with said information in a fossilized data format that does not comprise meta data field identifiers;

computer readable program code which causes said programmable computer processor to recognize a meta data format field, a meta data context field, a meta data retention field, a meta data storage management field, a meta data data management field, and a meta data audit field, by the order of those meta data fields;

computer readable program code which causes said programmable computer processor to instruct said one or more data storage devices to write said information to said one or more data storage devices based upon said meta data format field.

8. The information storage medium of claim 7, further comprising:
computer readable program code which causes said programmable computer processor to determine if said meta data comprises instructions encoded in said retention field,
computer readable program code which, if said meta data does not comprise instructions encoded in said retention field, causes said programmable computer processor to generate, based upon entries written to said context field, a retention policy comprising a retention time for said information and a retention time for said meta data.

9. The information storage medium of claim 8, further comprising computer readable program code which, if said meta data does not comprise instructions encoded in said retention field, causes said programmable computer processor to generate, based upon entries written to said context field, a retention policy further comprising an information protection mode, and a meta data protection mode.

10. The information storage medium of claim 7, further comprising:
computer readable program code which causes said programmable computer processor to determine if said meta data comprises a data management field,
computer readable program code which, if said meta data does not comprise a data management field, causes said programmable computer processor to generate, based upon entries written to said context field, a data management policy comprising service levels for said information, wherein said service levels comprise an information availability level selected from the group consisting of HIGH, MEDIUM, and LOW.

11. The information storage medium of claim 10, further comprising computer readable program code which, if said meta data does not comprise instructions encoded in said data management field, causes said programmable computer processor to generate, based upon entries written to said context field, a data management policy further comprising a disaster protection level.

12. The information storage medium of claim 7, further comprising:

computer readable program code which causes said programmable computer processor to determine if said meta data comprises a storage management field, computer readable program code which, if said meta data does not comprise a storage management field, causes said programmable computer processor to generate, based upon entries written to said context field, a storage management policy comprising instructions regarding the migration of said information to differing information storage media.

13. The information storage medium of claim 7, further comprising:

computer readable program code which causes said programmable computer processor to determine if said meta data comprises an audit field, computer readable program code which, if said meta data does comprise an audit field, causes said programmable computer processor to determine if said audit field comprises one or more entries;

computer readable program code which, if said audit field does comprise one or more entries, causes said programmable computer processor to delete those one or more entries.

14. The information storage medium of claim 13, further comprising computer readable program code which, if said meta data does not comprise an audit field, causes said programmable computer processor to add an audit field to said meta data.

15. The information storage medium of claim 14, further comprising:

computer readable program code which causes said programmable computer processor to receive a command to audit said information;

computer readable program code which causes said programmable computer processor to record said audit command in said audit field.

* * * * *